United States Patent
LaRocco et al.

(10) Patent No.: US 6,743,742 B1
(45) Date of Patent: Jun. 1, 2004

(54) METHOD OF PARTIALLY EMBEDDING NON-WOVEN FIBER MAT TO REINFORCING FIBERS IMPREGNATED WITH A THERMOPLASTIC RESIN AND COMPOSITION THEREFROM

(75) Inventors: Michael C. LaRocco, Sewickley, PA (US); Samuel J. Osten, Pittsburgh, PA (US)

(73) Assignee: American Made, LLC, Ambridge, PA (US)

(*) Notice: Subject to any disclaimer, the term of this patent is extended or adjusted under 35 U.S.C. 154(b) by 178 days.

(21) Appl. No.: 10/072,801

(22) Filed: Feb. 8, 2002

Related U.S. Application Data

(60) Provisional application No. 60/267,499, filed on Feb. 8, 2001.

(51) Int. Cl.⁷ ................................. B32B 27/04
(52) U.S. Cl. ................. 442/394; 428/296.7; 428/297.1; 428/299.4; 442/286; 442/401; 442/402
(58) Field of Search .................. 428/296.4, 297.1, 428/299.4; 442/286, 394, 401, 402

(56) References Cited

U.S. PATENT DOCUMENTS 5,316,834 A * 5/1994 Matsuda et al. ............ 442/247

* cited by examiner

*Primary Examiner*—Arti R. Singh
(74) *Attorney, Agent, or Firm*—Webb Ziesenheim Logsdon Orkin & Hanson, P.C.

(57) ABSTRACT

A composite sheet has a layer of reinforcing fiber impregnated with a thermoplastic resin. Non-woven fiber is partially impregnated with the thermoplastic resin to provide a bondable surface that can be subsequently bonded to other materials, such as plastics, foam and metal. Such an apparatus may be formed by heating and compressing the thermal plastic resin against the reinforcing fibers of the base layer and against the non-woven fibers, such that the base layer may be fully impregnated while the non-woven fibers may be partially impregnated. A thermal plastic resin must have a melting point less than either the reinforcing fibers of the base layer, or the non-woven fibers.

13 Claims, 4 Drawing Sheets

METHOD OF PARTIALLY EMBEDDING NON-WOVEN FIBER MAT TO REINFORCING FIBERS IMPREGNATED WITH A THERMOPLASTIC RESIN AND COMPOSITION THEREFROM

CROSS-REFERENCE TO RELATED APPLICATION

This application claims the benefit of U.S. Provisional Application Serial No. 60/267,499, filed Feb. 8, 2001.

BACKGROUND OF THE INVENTION

1. Field of the Invention

The invention relates to partially embedding through impregnation a non-woven fiber mat to a reinforcing fiber by fully impregnating the reinforcing fiber with thermoplastic and partially impregnating the non-woven fabric mat, thereby leaving exposed at least part of the surface of the non-woven mat for mechanical bonding.

2. Description of Related Art

Bonding to thermoplastic materials is currently accomplished by a variety of surface treatments that chemically modify the surface of the material, including chemical treatments of primers, flame treating or corona treating.

Two problems arise from using these methods. First, the process requires a second processing step that involves additional equipment and cost. Second, the bond is a chemical bond that occurs only at the surface of the interface with two materials.

The prior art bonds a non-woven fiber mat or fabric to the surface of materials, such as steel or aluminum, using a variety of adhesives. The exposed fibers of the non-woven mat or fabric are then available for subsequent bonding.

It is an object of this invention to provide a process for the mechanical attachment of a non-woven fiber mat onto the surface of a thermoplastic sheet to provide a means for the subsequent bonding of the thermoplastic sheet to a variety of materials using a variety of different processes.

SUMMARY OF THE INVENTION

To overcome or reduce these problems, the inventors have developed a process for partially embedding a non-woven fiber mat to the surface of a thermoplastic resin impregnated reinforcing fiber sheet.

In one embodiment of the invention, a composite sheet is comprised of:
  a) a base layer of reinforcing fibers impregnated with a thermoplastic resin;
  b) a mat adjacent to the layer wherein the mat is made of a non-woven fiber;
  c) wherein the non-woven fiber mat is partially impregnated with the thermoplastic resin of the base layer thereby creating a mechanical bond between the base layer and the mat to provide a bondable surface with the non-impregnated surface of the non-woven fiber; and
  d) wherein the thermoplastic has a melting point less than the melting point of the reinforcing fibers in the base layer and less than the melting point of the non-woven fiber mat.

Another embodiment of the invention is directed toward a method for partially embedding a non-woven fiber mat to a base layer of reinforcing fibers using thermoplastic resin to form a composite sheet having a bondable surface, wherein the method comprises the steps of:
  a) providing an impregnated base layer having reinforcing fibers with thermoplastic resin impregnated therein; and
  b) partially impregnating the non-woven fiber mat with the thermoplastic resin thereby mechanically bonding one side of the non-woven fiber mat to the thermoplastic resin impregnated within the base layer and forming a composite sheet having a mechanically bondable surface on the other side of the non-woven fiber mat, wherein the thermoplastic resin has a melting point of less than the melting point of the reinforcing fibers in the base layer and less than the melting point of the non-woven fiber mat.

The impregnated base layer may utilize a preexisting impregnated base layer with thermoplastic resin impregnated therein.

The impregnated base layer may be formed by heating a non-consolidated thermoplastic resin and compressing the thermoplastic resin against the reinforcing fibers of the base layer.

Also, the formation of the impregnated base layer and the step of partially impregnating the woven fiber mat may occur simultaneously.

Yet another embodiment is directed to a composite sheet having at least one side with a mechanically bondable face. The composite sheet is produced by a method comprising the steps of:
  a) providing a base layer of reinforcing fiber impregnated with a thermoplastic resin and
  b) partially impregnating a non-woven fiber of mat with the thermoplastic resin from the impregnated base layer thereby mechanically bonding one side of the non-woven fiber to the woven fiber and forming a composite sheet having a mechanically bondable surface on the other side of the non-woven fiber.

DESCRIPTION OF THE PREFERRED EMBODIMENTS

For assistance in understanding the figures, the base layer has been designated "B," the thermoplastic layer designated "T" and the non-woven fiber layer designated "N." Furthermore, the location of the heaters and coolers have been designated with "H" and "C", respectively.

Figure 1:
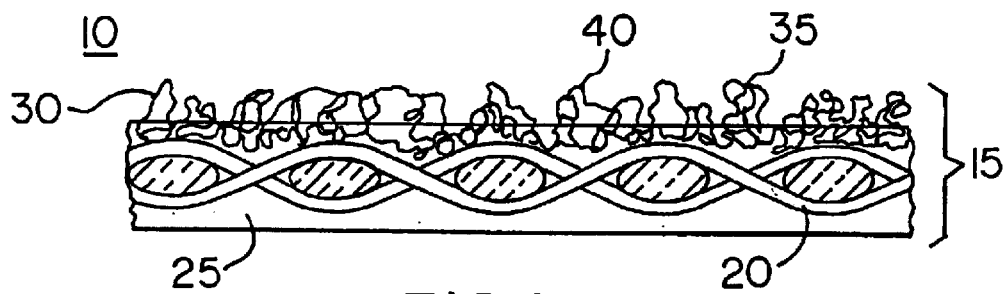
FIG. 1 is a cross-sectional view of a composite sheet in accordance with the subject invention.

FIG. 1 illustrates a cross-sectional view of a composite sheet 10 having a base layer 15 of reinforcing fiber 20 impregnated with a thermoplastic resin 25. A non-woven mat 30 adjacent to the layer is made of a non-woven fiber 35. The non-woven fiber mat 30 is partially impregnated with the thermoplastic resin 25 of the base layer 15, thereby creating a mechanical bond between the base layer 15 and the mat 30 and thereby providing a bondable surface with exposed non-impregnated surface 40 of the non-woven fiber 35 for subsequent bonding by a variety of adhesives or in a foaming process.

The thermoplastic resin 25 has a melting point less than the melting point of the reinforcing fibers 20 in the base layer 15 and, furthermore, has a melting point less than the melting point of the non-woven fibers 35 within the mat 30. As can be seen, the thermoplastic resin 25 impregnates only a portion of the non-woven fiber 35 in the mat 30, and mechanically attaches the non-woven fibers 35 to the thermoplastic resin 25.

While FIG. 1 illustrates reinforcing fibers 20 in a continuous woven pattern, it is entirely possible for the reinforcing fibers 20 to be either woven or non-woven fibers. Additionally, the reinforcing fibers 20 may be assembled in a pattern of woven mat, chopped mat, random mat, or randomly scattered fibers. Therefore, it is possible for the reinforcing fiber 20 in the base layer 15 to be made up of either continuous or discontinuous fibers. Reinforcing fibers 20 comprised of woven mat, chopped mat, random mat, and randomly scattered fibers are commonly impregnated with thermoplastic resin and sold commercially as fabrics by such companies as Saint Gobain Vetrotex America under the trademark Twintex and from Johns Manville, and as sheets from companies such as Azdel, Inc., Quadrant, and American Made, LLC. Additionally, the reinforcing fiber 20 in the base layer 15 may be made from many different materials, including fiberglass, carbon, aramide, nylon, polyolefin and natural fibers such as flax, cellulose and wood.

Directing attention to the thermoplastic resin, the resin may be selected from commercially available thermoplastic resins, including ABS, nylon, polyester, polyolefin, polypropylene, PVC and polystyrene. As will be discussed further, the thermoplastic resin will be heated to at least its melting point. However, prior to being heated, the thermoplastic resin may be in the form of film, sheet, pellets, or particles.

The non-woven fiber 35 of the mat 30 may be comprised of, among others, fiberglass, polyester, or nylon. Additionally, the non-woven fiber 35 may be combined to form a sheet and such combination may be accomplished using a technique such as spunbond, point bond, flat bond or needle punch.

The non-woven fiber 35 is preferably impregnated within the thermoplastic resin 25 from the base layer 15 such that between 25 to 75 percent of the non-woven fiber 35 is submerged within the thermoplastic resin 25. It can be appreciated that the portion of non-woven fiber 35 that is not impregnated will extend from the base layer 15, thereby providing a surface with fibers exposed for subsequent binding operations. By creating a bondable surface in such a fashion, it is possible now to use urethane foams and/or adhesives to attach the exposed non-woven fibers 35 of the mat 30 to another element.

While a variety of different materials have been listed as materials for the reinforcing fibers 20 of the base layer 15, the thermoplastic resin 25 and for the non-woven fiber 35 of the mat 30, it should be appreciated that only certain combinations of these materials are acceptable. In particular, the thermoplastic resin 25 used to create the composite sheet 10 must have a melting point less than the melting point of the reinforcing fibers 20 of the base layer 15, and must have a melting point less than the melting point of the non-woven fiber 35 of the mat 30. In such a fashion, the thermoplastic resin 25 may be heated to its melting point and the reinforcing fibers 20 of the base layer 15 and the non-woven fibers 35 of the mat 30 may be selectively impregnated.

In preferred embodiments of the subject invention, the reinforcing fibers 20 of the base layer 15 and the thermoplastic resin 25 may be one pair from the group of pairs consisting of fiberglass fibers with polypropylene thermoplastic resin, carbon fibers with polypropylene thermoplastic resin, aramide fibers with nylon thermoplastic resin, polyester fibers with polypropylene thermoplastic resin, and polyolefin fibers with polyolefin thermoplastic resin. It should be noted that certain polyolefin materials, depending upon additives, melt at a higher temperature than other polyolefin materials.

When the non-woven fibers 35 of the mat 30 are comprised of fiberglass, the overall density of the mat 30 should be between 1.5 ounces per square yard to 6.0 ounces per square yard and, preferably, for polyester or organic fibers should be between 0.75 ounces per square yard to 3.0 ounces per square yard.

There are a multitude of different methods that may be employed to form the composite sheet 10. A key element to each of these methods is the necessity to heat the thermoplastic resin in whatever form the thermoplastic resin may take, to a temperature above the melting point of the thermoplastic resin such that it may impregnate the reinforcing fibers of the base layer and may furthermore impregnate the non-woven fibers of the mat. The reinforcing fibers of the base layer will be fully impregnated, and the non-woven fibers of the mat will not be fully impregnated to ensure at least a portion of the fibers are protruding above the thermoplastic resin to provide a bondable surface for other materials to be adhered to the composite sheet. With a pre-existing sheet of a fully impregnated base layer, the heated thermoplastic resin should be compressed against the non-woven fabric of the mat. In the case where the thermoplastic resin and reinforcing fibers of the base layer have not yet been impregnated, then the thermoplastic resin may first be heated and impregnate the reinforcing fibers of the base layer, or may be heated and impregnate simultaneously both the reinforcing fibers of the base layer and the non-woven fabric of the mat to form a composite sheet. After the composite sheet has been formed, it is necessary to cool the sheet and, in an effort to reduce the cooling time, external cooling devices may be used upon the composite sheet.

In accordance with the subject invention, the method for partially embedding a non-woven fiber mat 30 to a base layer 15 of reinforcing fibers using thermoplastic resin 25 to form a composite sheet 10 may be done in a number of different ways. As will be discussed, the process may begin with a pre-existing impregnated base layer, which is then laminated with a non-woven fiber mat to form the composite sheet. In the alternative, a non-consolidated thermoplastic resin may be heated and compressed against the base layer to form an impregnated base layer, which is then combined with the non-woven fiber mat. Finally, it is possible to heat and compress, between a base layer and a non-woven fiber mat, a thermoplastic resin thereby simultaneously impregnating both the base layer and the non-woven fiber mat.

Figure 2:
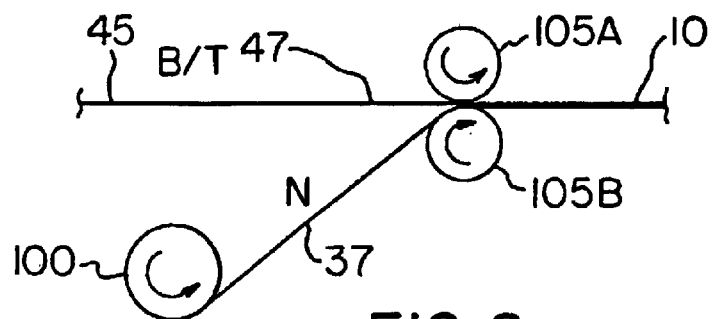
FIG. 2 is a schematic of one process that may be utilized to manufacture the composite sheet in accordance with the subject invention.

Directing attention to FIG. 2, a pre-existing resin-impregnated base layer 45 may be in the form of a sheet 47 which, as previously mentioned, is commercially available from a number of different suppliers. A supply roll 100 of non-woven fiber in the form of a sheet 37 is compressed with an impregnated sheet 47 between two pressure rollers 105A, 105B, to form a composite sheet 10. The impregnated base layer sheet 47 may be heated before or during compression with the non-woven fiber sheets 37. After the composite sheet 10 is formed by passing through the rollers 105A, 105B, the sheet 10 should be cooled to a temperature below that of the melting point of the thermoplastic resin.

Figure 3:
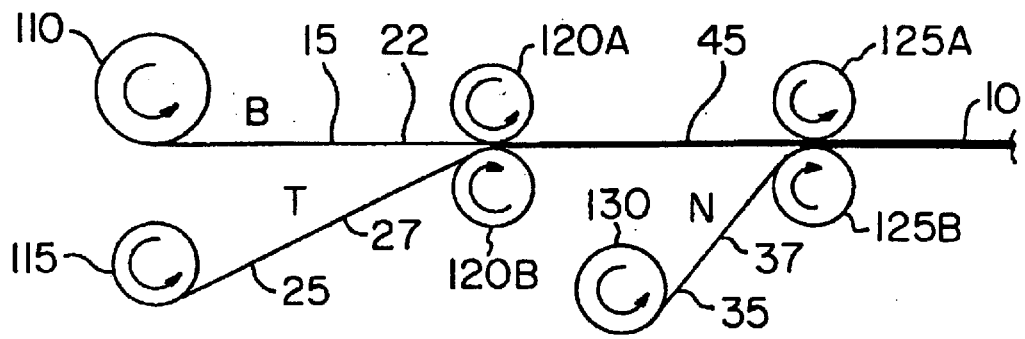
FIG. 3 is a schematic of another process that may be utilized to manufacture the composite sheet in accordance with the subject invention.

In accordance with another embodiment of the subject invention, and directing attention to FIG. 3, a base layer 15 of reinforcing fibers in the form of a sheet 22 is provided by supply roll 110, while thermoplastic resin in the form of the sheet 27 is provided by supply roll 115. The sheet 22 of the base layer 15 is compressed against the sheet 27 of thermoplastic resin 25 between two pressure rollers 120A, 120B, where the thermoplastic sheet 27 impregnates the base layer sheet 22. The thermoplastic sheet 27 must be heated before or during compression by the pressure rollers 120A, 120B to a temperature above the melting point of the resin 25, but below the melting point of the reinforcing fibers of the base layer 15. The impregnated base layer 45 is now introduced to a second set of pressure rollers 125A, 125B, where a sheet 37 of a non-woven fiber 35 is provided from a supply roll 130. The non-woven fiber sheet 37 is compressed against the heated impregnated base layer 45 such that the non-woven fiber sheet 37 becomes partially impregnated with the resin from the impregnated base layer 45. Just as before, the impregnated base layer 45 may be heated before or during compression by the pressure rollers 125A, 125B. The temperature must be above the resin melting point, but below the melting point of both the reinforcing fibers of the base layer 15 and the non-woven fibers 30 of the sheet 37. Thereafter, the resulting composite sheet 10 may be cooled to a temperature below the melting point of the thermoplastic resin.

Figure 4:
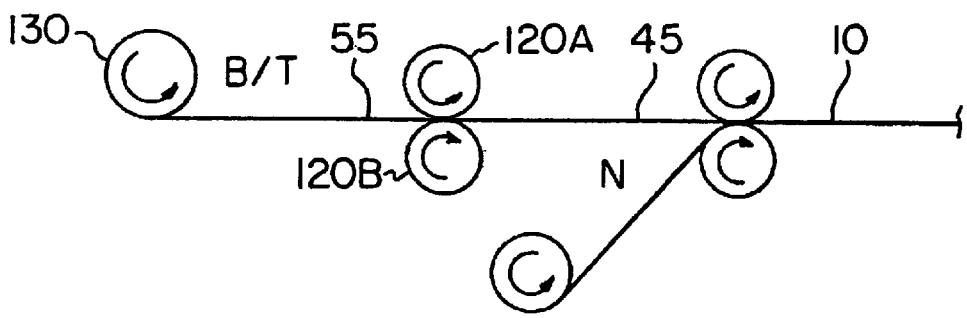
FIG. 4 is a schematic of yet another process that may be utilized to manufacture the composite sheet in accordance with the subject invention.

While FIG. 3 illustrates a base layer sheet 22 provided by a supply roll 110, and a separate non-consolidated thermoplastic sheet 27 provided by supply roll 115, as illustrated in FIG. 4, it is possible for a non-consolidated thermoplastic resin to be woven with the reinforcing fiber of the base layer whereby the fibers in each layer form threads which are commingled to form a single non-consolidated sheet 55 provided by supply roll 130. Just as the separate and distinct base layer sheet 22 and thermoplastic sheet 27 were heated and compressed by opposing rollers 120A, 120B in FIG. 3, so too may the non-consolidated sheet 55 be heated and compressed by rollers 120A, 120B to form an impregnated base layer 45, which may proceed to be processed in the same manner as that of impregnated base layer 45 discussed in FIG. 3 to produce a composite sheet 10.

Figure 5:
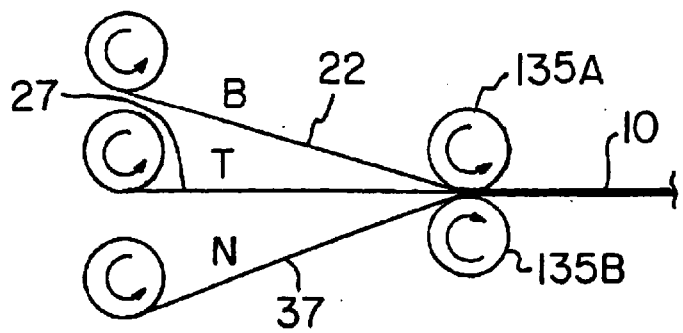
FIG. 5 is a schematic of yet another process that may be utilized to manufacture the composite sheet in accordance with the subject invention.

Directing attention to FIG. 5, in yet another embodiment, the step of providing an impregnated base layer, and the step of partially impregnating the non-woven fiber sheet 37, may occur simultaneously. The sheet 27 of thermoplastic resin may be heated and compressed simultaneously between the sheets 22 of the base layer and the sheet 37 of the non-woven fiber 35, such that the base layer sheet 22 is fully impregnated and the non-woven fiber sheet 37 is partially impregnated. The thermoplastic resin sheet 27 may be heated prior to or during the compression by pressure rollers 135A, 135B of these layers to produce a composite sheet 10, which may subsequently be cooled to a temperature below the melting point of the thermoplastic resin.

The thermoplastic resin may be heated by convection using, for example, hot air; conduction using, for example, heated rollers or belts; and radiation using, for example, infrared heaters, or a combination of these. FIGS. 6–9 illustrate methods of heating and cooling for arrangements similar to those illustrated in FIGS. 2–5.

Figure 6:
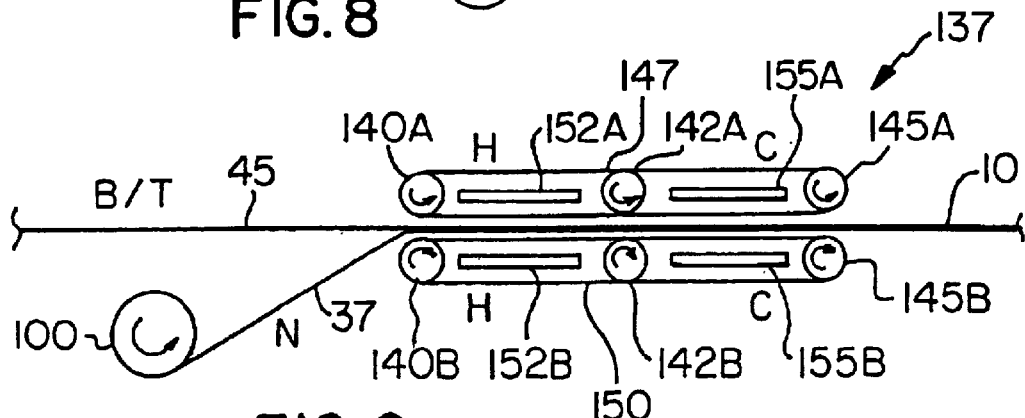

FIG. 6 illustrates an arrangement similar to FIG. 2 with the introduction, however, of a double belt press 137 to promote lamination between the impregnated base layer sheet 45 and the sheet 37 of non-woven fiber provided from supply roll 100. Three pairs of opposing pressure rollers 140A, 140B; 142A, 142B; and 145A, 145B operate a top belt 147 and a bottom belt 150, which are spaced from one another a distance sufficient to permit the impregnated base layer sheet 45 and non-woven fiber sheet 37 to pass therebetween in a compressed state. Heating sections 152A, 152B are located adjacent to the inner portions of the top belt 147 and bottom belt 150 to apply heat to the impregnated base layer sheet 45 and non-woven fiber sheet 37. Under these circumstances, heat is transmitted to the compressed sheets by heat conduction through the top belt 147 and the bottom belt 150. Once the non-woven fiber sheet 37 is partially impregnated within the base layer sheet 22, then the composite sheet 10 may be cooled utilizing cooling sections 155A, 155B. Typically, cooling will be accomplished through conduction through the top belt 147 and the bottom belt 150, or convection against the composite sheet 10.

It should be appreciated that any number of conventional methods for heating or cooling the composite sheet 10 may be utilized and those discussed herein may be preferred, however, they are only exemplary of other methods that are known by those skilled in the art of molding thermoplastics.

Figure 7:
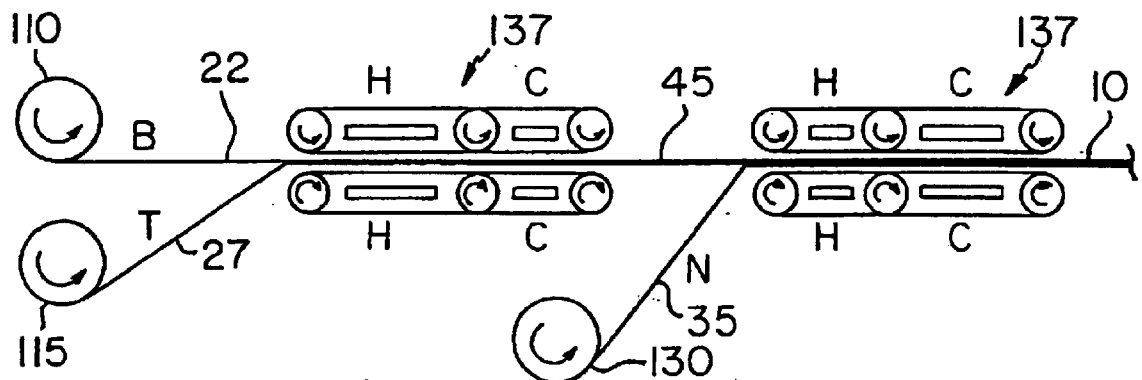
FIGS. 6–9 represent processes similar to those illustrated in FIGS. 2–5, however, introduce schematics of hardware that may be used to heat and cool the composite sheet at the appropriate times.
Figure 8:
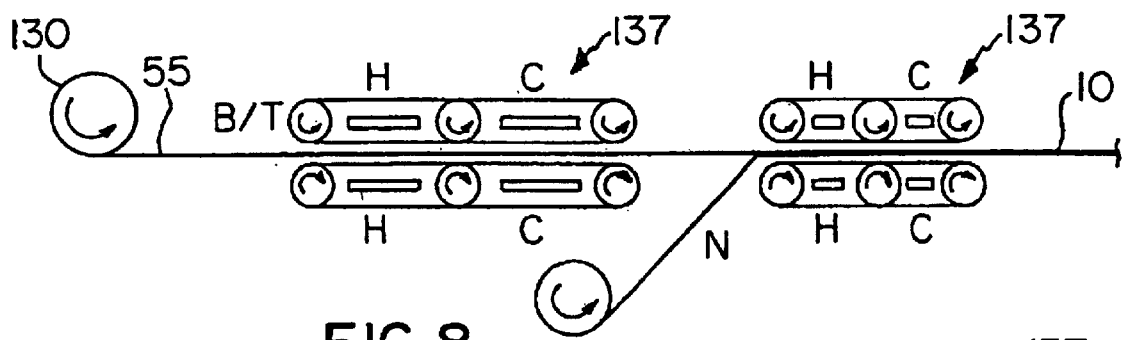
Figure 9:
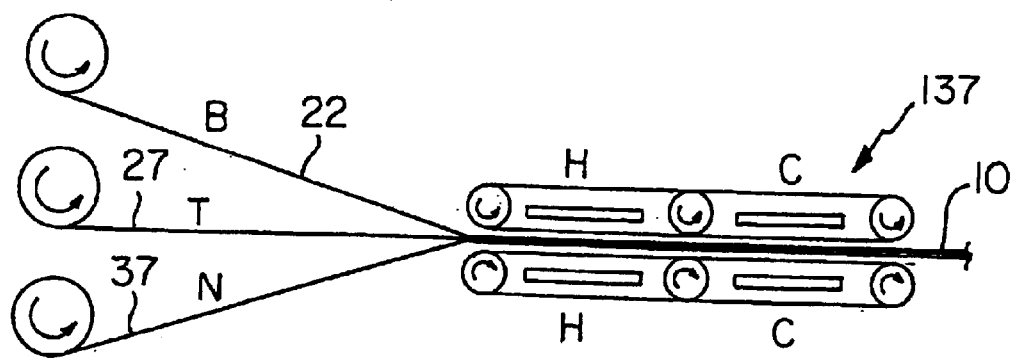

FIGS. 7, 8 and 9 are similar to FIGS. 3, 4 and 5 with the introduction of heating and cooling mechanisms similar to those in FIG. 6. For that reason, the same reference numerals for the belts and heat sections described in FIG. 6 are also used in FIGS. 7–9 and the process associated with FIGS. 3–5, which has already been described, is applicable to the arrangements illustrated in FIGS. 7–9. The double belt press 137 may be used at two locations in the process to heat and cool the sheets.

It has been previously mentioned that the thermoplastic resin may be heated before or during compression with either the base layer or the non-woven fiber mat.

Figure 10:
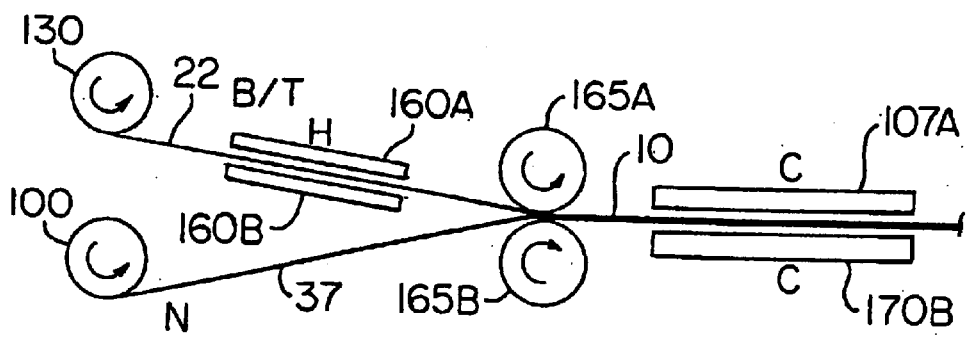
FIG. 10 is a schematic illustrating hardware and an alternate location for such hardware to heat and cool the composite sheet in accordance with the subject invention.

FIG. 10 illustrates an arrangement whereby the base layer sheet 22 supplied from pressure roll 130 is exposed to heating sections 160A, 160B prior to being compressed against the sheet 37 of non-woven fiber provided by supply roll 100. Upon being compressed by opposing pressure rollers 165A, 165B, the composite sheet 10 is cooled by cooling sections 170A, 170B, which operate as previously discussed cooling sections. Heating the thermoplastic resin prior to compression with either the base layer sheet 22, or the non-woven fiber sheet 37 may occur for different embodiments described herein.

Heating and compression of the base layer, the thermoplastic resin, and the non-woven fiber mat under circumstances whereby each of these materials is provided in a sheet form has been discussed.

However, it is entirely possible for the materials to be in a form other than a sheet. In particular, the thermoplastic resin, prior to heating, may be in the form of pellets or particles. Furthermore, the base layer, prior to heating, may be in the form of discontinuous, chopped, or random fibers, which may be formed into a sheet only after being impregnated with the thermoplastic resin. Finally, it is entirely possible for the non-woven fabric to be made up of discontinuous, chopped, or random fibers that are impregnated within the thermoplastic resin to form a sheet. These features are highlighted in FIGS. 11–13.

Figure 11:
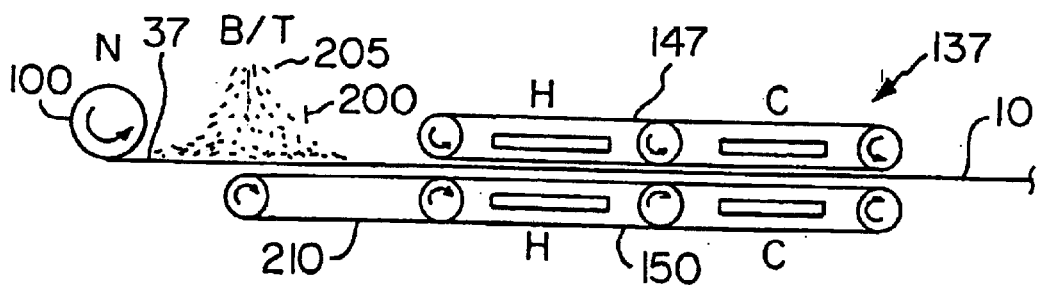
FIGS. 11–13 are schematic drawings illustrating a process whereby one or more of the reinforcing fiber of the base layer, the thermoplastic resin, and the non-woven fiber mat may be introduced to the process as a pellet or chopped fiber composition.

FIG. 11 illustrates an arrangement whereby the reinforcing fibers of the base layer are in the form of discontinuous, chopped, or random fibers illustrated as short lines labeled 200. The chopped fiber 200 intended as the base layer may be commingled with thermal plastic resin in the form of pellets or particles illustrated by dotted lines identified as 205. The chopped fibers 200 of the base layer and the particles 205 of the thermoplastic resin are dispersed upon a sheet 37 of non-woven fiber provided from supply roll 100. The sheet 37 of non-woven fiber is supported and transported by a carrier belt 210 to a double belt press 137, at which time the chopped fibers 200 of the base layer, the thermoplastic particles 205, and the sheet 37 of non-woven fibers is compressed and heated by the double belt press 137 arrangement utilizing the top belt 147 and the bottom belt 150, and the associated rollers heating sections and cooling sections previously discussed with, for example, the discussion of FIG. 6, to produce a composite sheet 10.

Figure 12:
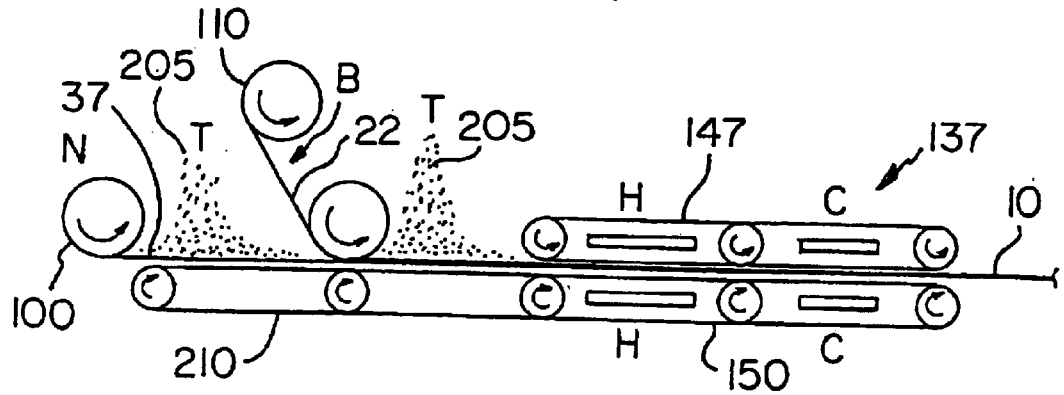

In the alternative and, as illustrated in FIG. 12, a sheet 37 of non-woven fiber from supply roll 100 may be used in conjunction with a sheet 22 of reinforcing fibers provided from supply roll 110 to produce a composite sheet 10. Under such circumstances, thermoplastic particles 205 are dispersed upon the surface of sheet 37 of non-woven fiber supported and transported on carrier belt 210, and thereafter, a base layer sheet 22 is compressed against the sheet 37 of non-woven fiber and additional thermoplastic particles 205 are dispersed upon the upper surface of the sheet 22. At this point, the base layer sheet 22, thermoplastic particles 205 and non-woven fiber sheet 37 are heated and compressed in a fashion as previously discussed to produce a composite sheet 10. It should be noted that it is also possible to heat and compress the thermoplastic particles 205 and the sheet 37 of non-woven fiber prior to heating and compressing together all of the sheet 37, resin 205 and sheet 22.

Figure 13:
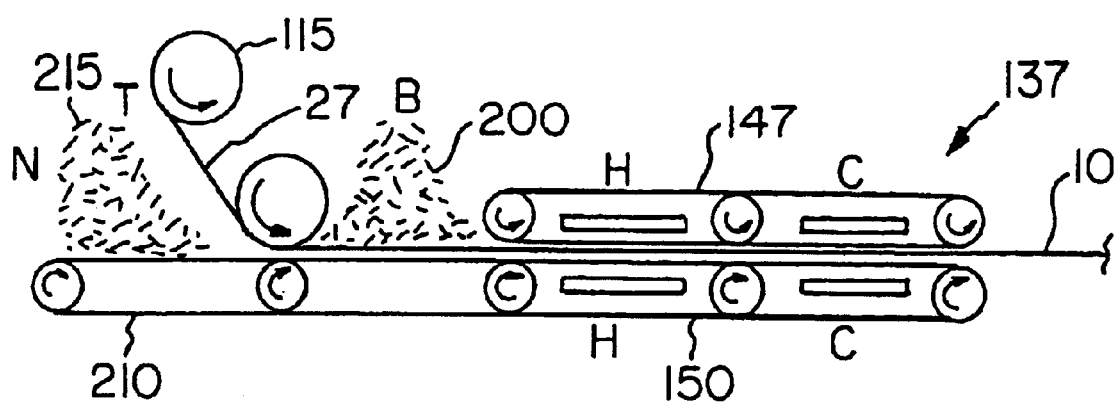

Additionally, as illustrated in FIG. 13, it is entirely possible to utilize a sheet 27 of thermoplastic resin provided by supply roller 115, whereby chopped, non-woven fiber, indicated by dashes labeled as 215, is dispersed upon carrier belt 210 and compressed against the sheet 27 of thermoplastic resin. Thereafter, chopped fibers of base layer material 200 are added to the upper surface of the sheet 27 of thermoplastic resin and the combination is now compressed and heated by the double belt press 137 arrangement illustrated by top belt 147 and bottom belt 150 previously discussed to produce a composite sheet 10.

Finally, while FIG. 11 and FIG. 12 illustrate arrangements whereby the non-woven fiber is in the form of a sheet, it is entirely possible for the non-woven fiber to be chopped and then impregnated with the heated thermoplastic resin. Such an arrangement may be envisioned by slightly modifying FIGS. 6–9 such that the non-woven fiber sheet 37 is introduced into the process as chopped fiber.

In order to partially impregnate the non-woven fiber into the thermoplastic, it is important to control the temperature to which the thermoplastic resin is exposed. For example, the temperature applied to the non-impregnated side of the non-woven fiber should be closely controlled relative to the temperature applied to the base layer side of the composite sheet 10. For thick materials in the range of 0.100 inch to 0.200 inch, the temperature applied to the non-woven fiber side of the composite sheet 10, can be 5–15° centigrade lower than the temperature of the opposing side. As an example, a typical temperature setting for thermoplastic polypropylene would be from 200–215° centigrade for the non-woven fiber side and 210–230° centigrade for the base layer side. In the case of thin material having a thickness of between 0.020 inch to 0.100 inch, the same temperature can be applied to both sides of the composite sheet 10. A typical temperature range for thin materials may be between 200–220° centigrade.

Furthermore, a controlled pressure should be applied to the materials to force the thermoplastic resin into the non-woven fiber mat. The roller pressure applied must be less than about 100 pounds per inch of width to prevent total impregnation of the non-woven fiber mat. Typically, the pressure applied to the composite sheet 10 ranges from 5 pounds per inch of width to 50 pounds per inch of width. The pressure can vary based on the type and area weight of the non-woven fiber mat, and the thickness of the impregnated base layer. A typical composite thickness of 0.050 inch using a 1.5 ounce per square yard point bonded polyester non-woven fiber mat would be subjected to a pressure of about 33 pounds per inch.

As previously discussed, the final step in creating a composite sheet 10 is cooling the thermoplastic resin below its melting point. After the thermoplastic resin has solidified, the fibers in the non-woven fiber mat are mechanically bonded to the thermoplastic resin embedded within the base layer. This creates a bondable surface with the fibers extending from the resin that can be subsequently bonded to other materials, such as plastics, foams and metals.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof

We claim:

1. A composite sheet comprised of:
   a) a base layer of reinforcing fibers impregnated with a thermoplastic resin;
   b) a mat adjacent to the layer wherein the mat is made of a non-woven fiber;
   c) wherein the non-woven fiber mat is partially impregnated with the thermoplastic resin of the base layer thereby creating a mechanical bond between the base layer and the mat thereby providing a bondable surface with the non-impregnated surface of the non-woven fiber; and
   d) wherein the thermoplastic has a melting point less than the melting point of the reinforcing fibers in the base layer and less than the melting point of the non-woven woven fiber mat.

2. The composite sheet according to claim 1 wherein between 25–75% of the non-woven fiber is impregnated with thermoplastic resin from the base layer.

3. The composite sheet according to claim 1 wherein the thermoplastic resin is a thermoplastic resin selected from the group consisting of ABS, nylon, polyester, polyolefin, polypropylene, PVC and polystyrene.

4. The composite according to claim 1 wherein the non-woven fiber of the mat is a fiber selected from the group consisting of fiberglass, polyester, and nylon.

5. The composite sheet according to claim 1 wherein the reinforcing fibers are from the group consisting of woven and non-woven fibers.

6. The composite sheet according to claim 1 wherein the fiber in the base layer is fiber having a pattern from the group consisting of woven mat, chopped mat, random mat and randomly scattered fibers.

7. The composite sheet according to claim 1 wherein the fiber in the base layer may contain either continuous or discontinuous fibers.

8. The composite sheet according to claim 1 wherein the non-woven fiber is manufactured by a technique selected from the group consisting of spunbond, point bond, flat bond and needle punch.

9. The composite sheet according to claim 1 wherein the fiber in the base layer is a fiber selected from the group consisting of fiberglass, carbon, natural fibers aramide, nylon, and polyolefin.

10. The composite sheet according to claim 9 wherein the natural fibers are selected from the group consisting of flax, cellulose and wood.

11. The composite sheet according to claim 1 wherein the reinforcing fibers and thermoplastic resin are one pair from the group of pairs consisting of fiberglass/polypropylene thermoplastic resin, carbon fiber/polypropylene thermoplastic resin, aramide fibers/nylon thermoplastic resin, polyolefin fibers/polyolefin thermoplastic resin, and polyester fibers/polypropylene thermoplastic resin.

12. The composite sheet according to claim 1 wherein the non woven fibers are comprised of fiberglass and have an overall density of between 1.5 oz/sq yd. to 6.0 oz/sq yd.

13. The composite sheet according to claim 1 wherein the non-woven fibers are polyester or organic fibers and have an overall density of between 0.75 oz/sq yd. to 3.0 oz/sq yd.

* * * * *

UNITED STATES PATENT AND TRADEMARK OFFICE
CERTIFICATE OF CORRECTION

| | | |
|---|---|---|
| PATENT NO. | : 6,743,742 B1 | Page 1 of 1 |
| APPLICATION NO. | : 10/072801 | |
| DATED | : June 1, 2004 | |
| INVENTOR(S) | : LaRocco et al. | |

It is certified that error appears in the above-identified patent and that said Letters Patent is hereby corrected as shown below:

Column 8, Lines 56-57, Claim 1, "non-woven woven fiber" should read --non-woven fiber--.

Signed and Sealed this

Twenty-ninth Day of May, 2007

JON W. DUDAS
*Director of the United States Patent and Trademark Office*

EX PARTE REEXAMINATION CERTIFICATE (6037th)

United States Patent
LaRocco et al.

(10) Number: US 6,743,742 C1
(45) Certificate Issued: Dec. 4, 2007

(54) METHOD OF PARTIALLY EMBEDDING NON-WOVEN FIBER MAT TO REINFORCING FIBERS IMPREGNATED WITH A THERMOPLASTIC RESIN AND COMPOSITION THEREFROM

(75) Inventors: Michael C. LaRocco, Sewickley, PA (US); Samuel J. Osten, Pittsburgh, PA (US)

(73) Assignee: American Made, LLC, Ambridge, PA (US)

Reexamination Request:
No. 90/007,411, Feb. 4, 2005

Reexamination Certificate for:
Patent No.: 6,743,742
Issued: Jun. 1, 2004
Appl. No.: 10/072,801
Filed: Feb. 8, 2002

Related U.S. Application Data
(60) Provisional application No. 60/267,499, filed on Feb. 8, 2001.

(51) Int. Cl.
*B32B 27/04* (2006.01)
*B32B 5/02* (2006.01)

(52) U.S. Cl. .............. 442/394; 428/296.7; 428/297.1; 428/299.4; 442/401; 442/402; 442/286

(58) Field of Classification Search ............ 442/286, 442/394, 401, 402; 428/296.7, 297.1, 299.4, 428/296.4
See application file for complete search history.

(56) References Cited

U.S. PATENT DOCUMENTS

| | | | |
|---|---|---|---|
| 3,264,167 A | * | 8/1966 | Sands ................. 428/133 |
| 3,431,334 A | * | 3/1969 | Williams et al. ......... 264/122 |
| 3,778,334 A | | 12/1973 | Sturgeon |
| 3,900,921 A | * | 8/1975 | Zafiroglu ................. 19/306 |
| 4,238,266 A | * | 12/1980 | Steinberg et al. ....... 156/243 |
| 4,333,979 A | * | 6/1982 | Sciaraffa et al. ......... 428/179 |
| 4,402,778 A | | 9/1983 | Goldsworthy |
| 4,612,238 A | * | 9/1986 | DellaVecchia et al. ... 442/180 |
| 4,869,526 A | * | 9/1989 | Blake ..................... 280/645 |
| 4,943,465 A | * | 7/1990 | Bailey et al. ............ 428/102 |
| 4,992,127 A | | 2/1991 | Kishi |
| 5,011,737 A | | 4/1991 | Smith |
| 5,173,356 A | * | 12/1992 | Eaton et al. ............ 428/219 |
| 5,203,940 A | | 4/1993 | Krone |
| 5,316,834 A | | 5/1994 | Matsuda |
| 5,403,654 A | * | 4/1995 | Muto et al. .............. 442/60 |
| 5,633,063 A | | 5/1997 | Lause |
| 5,911,932 A | * | 6/1999 | Dyksterhouse .......... 264/136 |
| 6,331,028 B1 | * | 12/2001 | O'Neill et al. ........ 296/100.01 |
| 6,872,273 B2 | | 3/2005 | Davies et al. |

* cited by examiner

*Primary Examiner*—Stephen Stein

(57) ABSTRACT

A composite sheet has a layer of reinforcing fiber impregnated with a thermoplastic resin. Non-woven fiber is partially impregnated with the thermoplastic resin to provide a bondable surface that can be subsequently bonded to other materials, such as plastics, foam and metal. Such an apparatus may be formed by heating and compressing the thermal plastic resin against the reinforcing fibers of the base layer and against the non-woven fibers, such that the base layer may be fully impregnated while the non-woven fibers may be partially impregnated. A thermal plastic resin must have a melting point less than either the reinforcing fibers of the base layer, or the non-woven fibers.

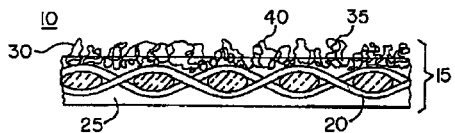

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–13 are cancelled.

* * * * *